(12) United States Patent
Ooki

(10) Patent No.: US 8,725,825 B2
(45) Date of Patent: May 13, 2014

(54) EXCHANGE SYSTEM CONNECTING TERMINALS IN DIFFERENT SYSTEMS

(75) Inventor: Yasuomi Ooki, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 2214 days.

(21) Appl. No.: 11/168,479

(22) Filed: Jun. 29, 2005

(65) Prior Publication Data

US 2006/0002316 A1    Jan. 5, 2006

(30) Foreign Application Priority Data

Jun. 30, 2004    (JP) ................. 2004-193839

(51) Int. Cl.
    G06F 15/16    (2006.01)
    H04L 5/00    (2006.01)

(52) U.S. Cl.
    USPC .......... 709/207; 709/203; 709/204; 709/206; 709/217; 709/219; 370/299

(58) Field of Classification Search
    USPC ......... 709/204–207, 217, 219, 223–225, 248; 370/299
    See application file for complete search history.

(56) References Cited

U.S. PATENT DOCUMENTS

| | | | | |
|---|---|---|---|---|
| 5,862,325 A | * | 1/1999 | Reed et al. | 709/201 |
| 6,254,480 B1 | * | 7/2001 | Zach | 463/17 |
| 6,356,937 B1 | * | 3/2002 | Montville et al. | 709/206 |
| 6,475,086 B2 | * | 11/2002 | Zach | 463/17 |
| 6,700,967 B2 | | 3/2004 | Kleinoder et al. | |
| 6,714,942 B1 | * | 3/2004 | Westcott | 707/103 R |
| 7,631,343 B1 | * | 12/2009 | Bennett et al. | 726/2 |
| 2003/0225843 A1 | | 12/2003 | Sakata | |
| 2004/0003037 A1 | | 1/2004 | Fujimoto et al. | |
| 2004/0030750 A1 | | 2/2004 | Moore et al. | |
| 2009/0009343 A1 | * | 1/2009 | Boyer et al. | 340/573.1 |

FOREIGN PATENT DOCUMENTS

| | | |
|---|---|---|
| JP | 10-271161 | 10/1998 |
| JP | 2002-016696 | 1/2002 |
| JP | 2003-115795 | 4/2003 |
| JP | 2003-186775 | 7/2003 |
| JP | 2003-189009 | 7/2003 |
| JP | 2003-244308 | 8/2003 |
| JP | 2003-271531 | 9/2003 |
| JP | 2003-296525 | 10/2003 |
| JP | 2003/316707 | 11/2003 |
| JP | 2004/030371 | 1/2004 |
| JP | 2004-030371 A | 1/2004 |
| JP | 2004-064647 | 2/2004 |
| WO | WO 02/077840 A | 10/2002 |
| WO | WO 02/077840 A1 | 10/2002 |
| WO | WO 2004/044782 A | 5/2004 |

* cited by examiner

Primary Examiner — Ranodhi Serrao
Assistant Examiner — Farrukh Hussain
(74) Attorney, Agent, or Firm — Foley & Lardner LLP

(57) ABSTRACT

An exchange system which allows for allows for the sharing and updating of presence information and address books between exchange-connected terminals and external terminals and allows for communication between exchange-connected terminals and external terminals via the use of pseudo exchange-connected terminals, pseudo external terminals and a pseudo external terminal & pseudo exchange-connected terminal is provided.

28 Claims, 10 Drawing Sheets

FIG.5

| EXCHANGE USER ID 501 | EXCHANGE USER PASSWORD 502 | IM USER ID 503 | IM USER PASSWORD 504 | PERSONAL ADDRESS BOOK DATA 505 |
|---|---|---|---|---|
| EXAMPLE: taro | EXAMPLE: taropass | EXAMPLE: taroim | EXAMPLE: taroimpass | EXAMPLE: Nichiden hanako,03-1111-2222 Nichiden Frontia,03-2222-3333 ... |
| EXAMPLE: hanako | EXAMPLE: hanakopass | EXAMPLE: hanakoim | EXAMPLE: hanakoimpass | EXAMPLE: Nichiden Taro,03-4444-5555 Nichiden Frontia,03-2222-3333 ... |

| SHARED ADDRESS BOOK DATA 506 |
|---|
| EXAMPLE: Nichiden hanako,03-1111-2222 Nichiden Taro,03-4444-5555 Nichiden Frontia,03-2222-3333 ... |

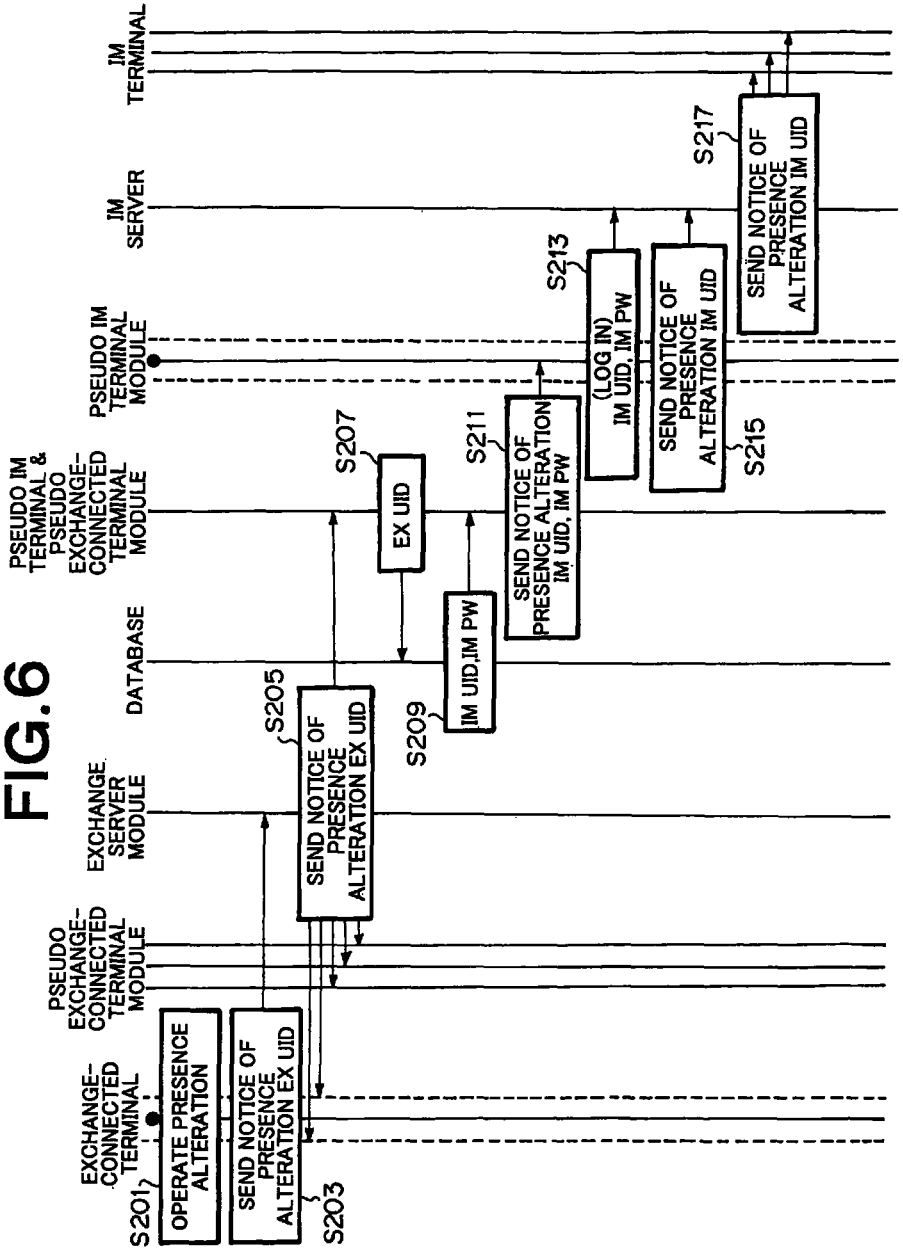

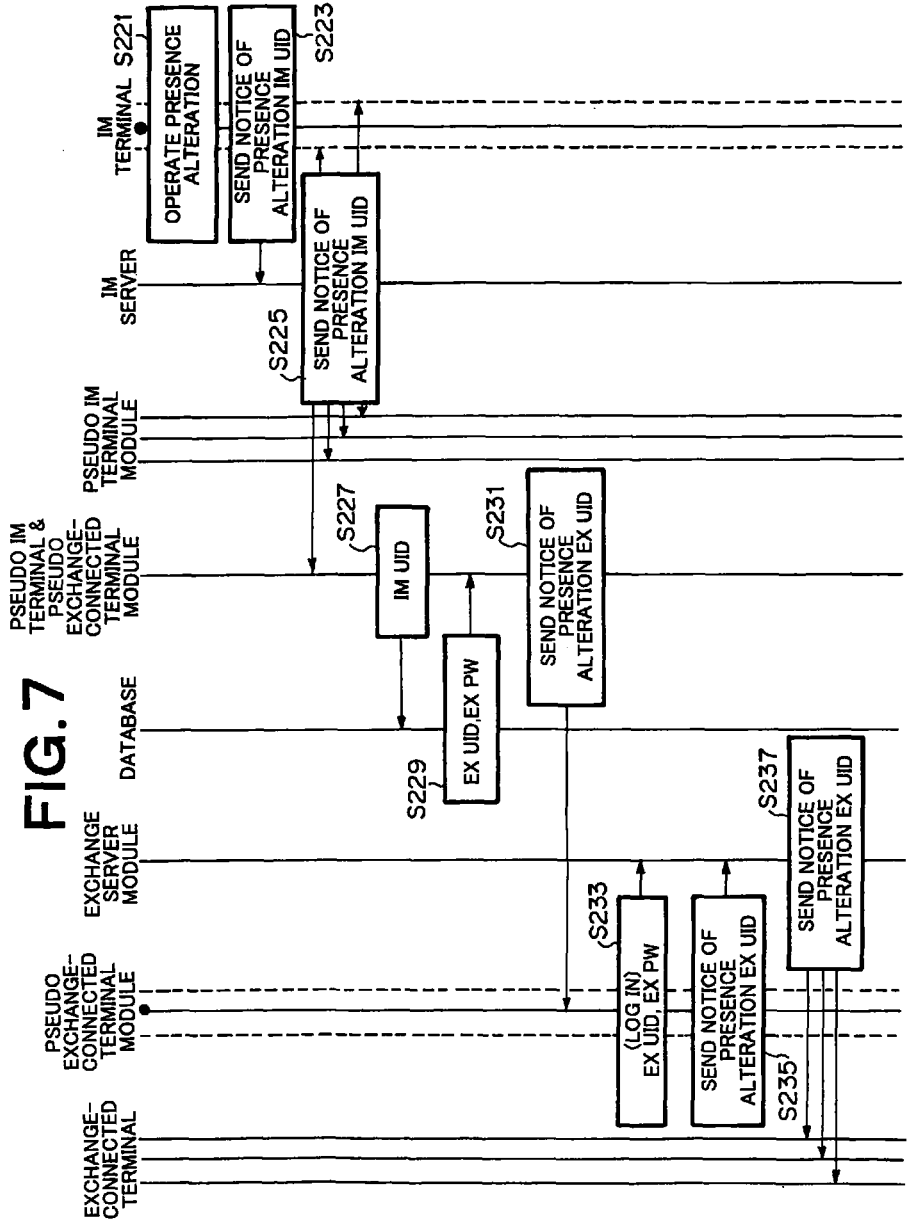

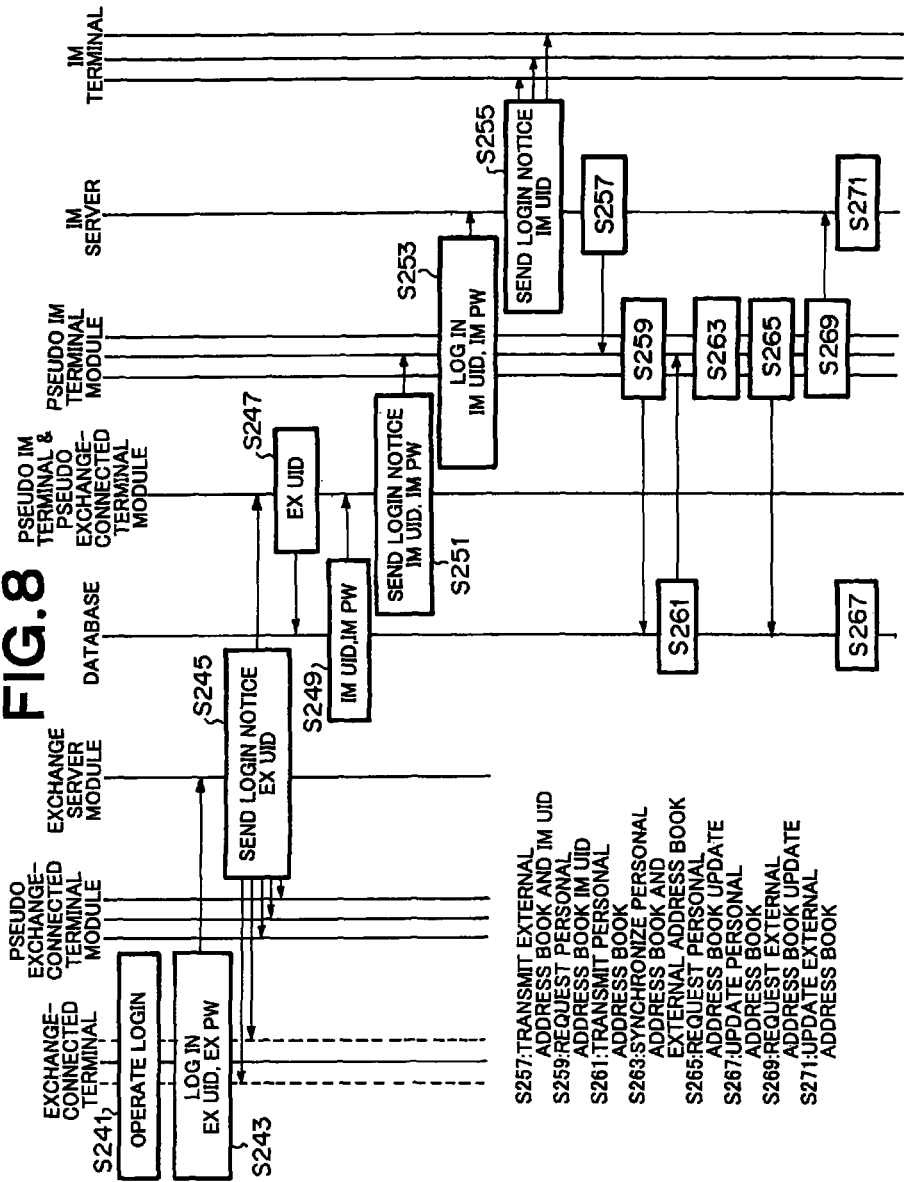

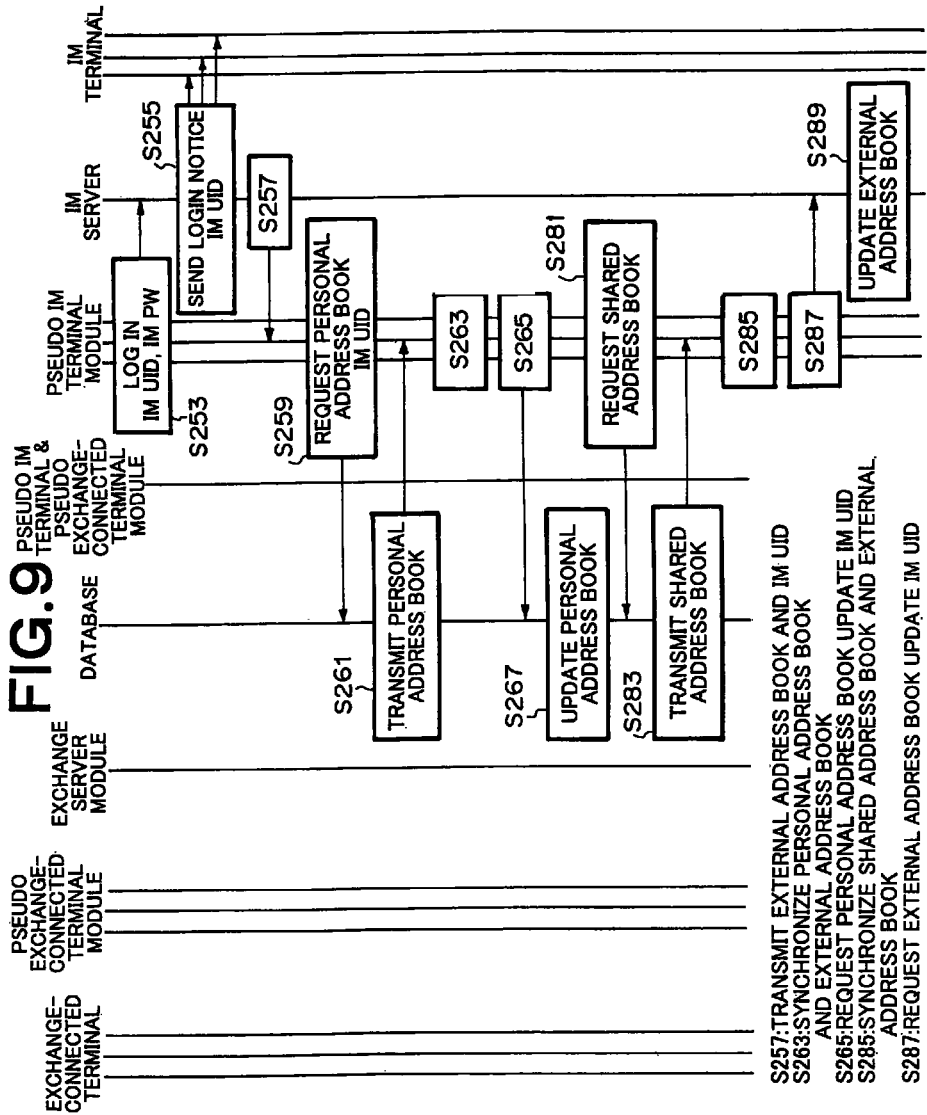

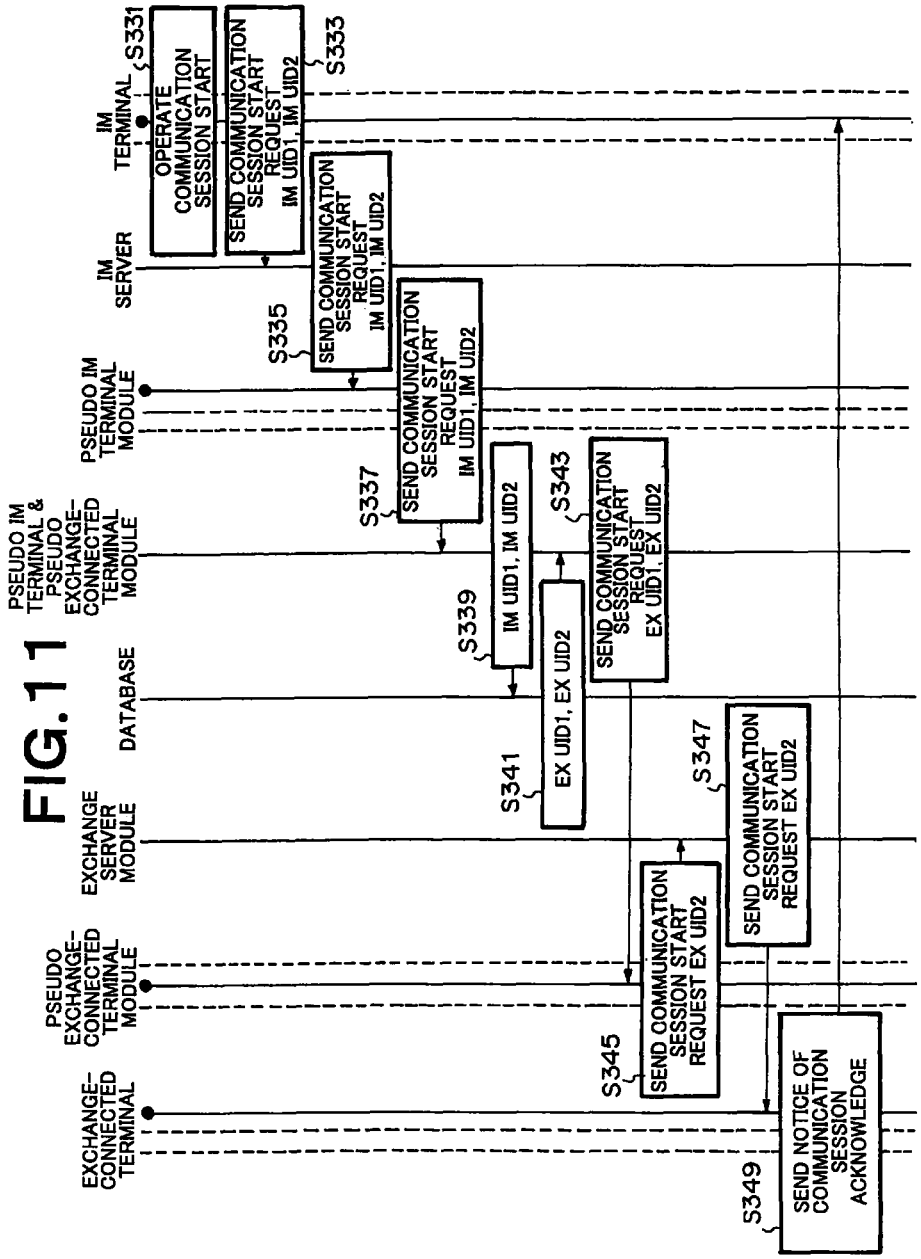

EXCHANGE SYSTEM CONNECTING TERMINALS IN DIFFERENT SYSTEMS

BACKGROUND OF THE INVENTION

1. Field of the Invention

The present invention relates to an exchange system used to connect an exchange-connected terminal connected to an exchange and an external terminal connected to an external server to each other.

2. Description of the Related Art

In recent years, instant message servers (hereafter referred to as "IM servers") which are communication servers having application sharing functions such as instant messages, presence, audio/video talking and white boards have appeared.

If a first terminal logs in only one of an IM server intended for ordinary consumers and an exchange intended for enterprises, a second terminal that logs in the other of them cannot give a notice of presence information of the second terminal to the first terminal, according to a conventional technique. Therefore, it is difficult to give a notice of one's current presence information to all colleagues, customers, acquaintances and friends who keep company with oneself. Even if there is a measure which solves this problem, it is a measure that requires that a special mechanism should be mounted on IM servers intended for ordinary consumers as well. The measure cannot be applied to IM servers intended for ordinary consumers which are basically different in manufacturer and difficult in specification alteration.

If one has a user account in both the IM server intended for ordinary customer and the exchange intended for enterprise and wants to generate address books in both of them, the address books are not synchronized to each other. At the time of registration and deletion, therefore, it is necessary to conduct the same operation in both terminals twice, resulting in troublesome work. Even if there is a measure which solves this problem, it is a measure that requires that a special mechanism should be mounted on IM servers intended for ordinary consumers as well. The measure cannot be applied to IM servers intended for ordinary consumers which are basically different in manufacturer and difficult in specification alteration.

Furthermore, if one logs in only one of the IM server intended for ordinary consumers and an exchange intended for enterprises, it is not possible to start a communication session with a terminal user in the other of them. Thus, it is not possible to immediately establish communication with all colleagues, customers, acquaintances and friends who keep company with oneself. Even if there is a measure which solves this problem, it is a measure that requires that a special mechanism should be mounted on IM servers intended for ordinary consumers as well. The measure cannot be applied to IM servers intended for ordinary consumers which are basically different in manufacturer and difficult in specification alteration.

A technique which synchronizes presences between terminals of a user who uses a plurality of terminals is described in JP-A-2004-30371. However, this is synchronization in the case where there are a plurality of terminals connected to the same system. This does not synchronize presences of different systems unlike the present invention.

A technique of synchronizing a current presence to a presence of a transfer destination is described in JP-A-2003-296525. This technique is different in effect from the present invention which aims at different systems and in particular at IM servers intended for ordinary consumers and synchronizes presences at terminals of different systems used by the same user.

A technique which processes presence information according to the state of the opposite party when transmitting the presence is described in JP-A-2003-189009. However, there is no concrete technique for the case where the opposite terminal belongs to a different system. Its main object is observability on the terminal side and to prevent transmission of a presence to a terminal having no relation. The technique is different in both object and measure from the present invention.

A method for mutually connecting presence information between systems which are different in configuration of presence information is described in JP-A-2003-186775. However, the prime object of this method is to absorb the difference in configuration of presence information. A method for connecting completely different servers to each other, such as a system login method and a management method, is not described. The method described in JP-A-2003-186775 differs from the present invention in object, measure and effect.

As for a technique which connects an existing telephone system and an IM system, a technique which synchronizes presence information according to the line situation of the existing telephone system is described in JP-A-2002-16696. Unlike the present invention, presence information of an existing telephone system terminal instead of the login situation or line is not synchronized. The technique is utterly different from the present invention.

SUMMARY OF THE INVENTION

An object of the present invention is to provide an exchange system which makes it possible to know presence information of a terminal connected to one system, at a terminal connected to the other system.

Another object of the present invention is to provide an exchange system which makes it possible to automatically conduct synchronization between an address book of one system and an address book of the other system.

Further object of the present invention is to provide an exchange system which makes it possible to establish a communication session between a terminal connected to one system and a terminal connected to the other system.

According to the present invention, there is provided an exchange system comprising:

a Local Area Network (LAN) server (an exchange server) that conducts exchange of communications, such as telephone, Emails and instant messages, which is adapted to connect terminals located on the LAN (exchange-connected terminals) to each other; program modules which conducts operations similar to those conducted by software in the exchange-connected terminals (pseudo exchange-connected terminals) which are adapted to correspond to respective terminals which are not located on the LAN (external terminals) and which are adapted to function as exchange-connected terminals with respect to the exchange server; program modules which conducts operations similar to those conducted by external terminals (pseudo external terminals) are adapted to be associated with respective exchange-connected terminals and are adapted to function as external terminals with respect to an external server; an exchange accessible database which is adapted to retain association relations between a first user identification to be used in the exchange-connected terminals and a second user identification to be used in the external terminals; and a program module obtained by combining a pseudo model which conducts operations similar to that conducted by software in the exchange-connected terminals with a pseudo model which conducts operation similar to that conducted by software in the external terminals (a pseudo external terminal & pseudo exchange-connected terminal) is adapted to retrieve the second user identification associated with the first user identification information from the database, retrieve the first user identification associated with the second user identification information from the database, function as the exchange-connected terminal with respect to the exchange server by using the first user identification information, and identify the pseudo external terminal to function as an associated external terminal with respect to the external server by using the second user identification information.

The exchange system may further comprise means for transmitting a presence alteration notice of one of the exchange-connected terminals to the external terminals.

In the exchange system, the exchange server may be adapted to, upon receiving a presence alteration notice containing the first user identification information from one of the exchange-connected terminals, transfer the presence alteration notice to at least the pseudo external terminal & pseudo exchange-connected terminal; the pseudo external terminal & pseudo exchange-connected terminal may be adapted to, upon receiving the transferred presence alteration notice, retrieve the second user identification information associated with the first user identification information contained in the presence alteration notice, from the database, and transmit a presence alteration notice containing the retrieved second user identification information to the pseudo external terminal; and the pseudo external terminal may be adapted to, upon receiving the presence alteration notice containing the retrieved second user identification information, transfer the presence alteration notice to the external server.

The exchange system may further comprise means for transmitting a presence alteration notice of one of the external terminals to the exchange-connected terminals.

In the exchange system, the pseudo external terminal & pseudo exchange-connected terminal may be adapted to, upon receiving a presence alteration notice containing the second user identification information from the external server, retrieve the first user identification information associated with the second user identification information contained in the presence alteration notice, from the database, and transmit a presence alteration notice containing the retrieved first user identification information to the pseudo exchange-connected terminal having the first user identification information; the pseudo exchange-connected terminal may be adapted to, upon receiving the transmitted presence alteration notice, transfer the presence alteration notice to the exchange server; and the exchange server may be adapted to, upon receiving the presence alteration notice containing the first user identification information, transfer the presence alteration notice to the exchange-connected terminals.

The exchange system may further comprise means for synchronizing a personal address book used by individual exchanged-connected terminals with an address book which is not located on the LAN (an external address book) used by the external terminals.

In the exchange system, the database may be adapted to retain association relations between first user identification information used by the exchange-connected terminals and the second user identification information and passwords used by the external terminals, and personal address books associated with the first and second user identification information; the exchange server is adapted to, upon receiving a login notice containing the first user identification information from one of the exchange-connected terminals, transfer the login notice to at least the pseudo external terminal & pseudo exchange-connected terminal; the pseudo external terminal & pseudo exchange-connected terminal, upon receiving the transferred login notice, retrieves the second user identification information and password associated with the first user identification information contained in the login notice from the database, and transmits a login notice containing the retrieved second user identification information and password to the associated pseudo external terminal; the associated pseudo external terminal may be adapted to, upon receiving the login notice containing the second user identification information and password, log into the external server; the associated pseudo external terminal may be adapted to receive the external address book from the external server; the associated pseudo external terminal may be adapted to acquire the personal address book associated with the first and second user identification information from the database; and the associated pseudo external terminal may be adapted to conduct synchronization between the external address book and the personal address book, and update the external address book and the personal address book during the synchronization.

The exchange system may further comprise means for synchronizing a personal address book used by individual exchanged-connected terminals and a shared address book used by all of the exchange-connected terminals with an external address book used by the external terminals.

In the exchange system, the database may be adapted to retain association and corresponding relations between first user identification information used by the exchange-connected terminals and the second user identification information and passwords used by the external terminals, the shared address book, and personal address books associated with user identification information; the exchange server may be adapted to, upon receiving a login notice containing the first user identification information from one of the exchange-connected terminals, transfer the login notice to at least the pseudo external terminal & pseudo exchange-connected terminal; the pseudo external terminal & pseudo exchange-connected terminal may be adapted to, upon receiving the transferred login notice, retrieve the second user identification information and password associated with the first user identification information contained in the login notice from the database, and transmit a login notice containing the retrieved second user identification information and password to the associated pseudo external terminal; the associated pseudo external terminal may be adapted to, upon receiving the login notice containing the second user identification information and password, log into the external server; the associated pseudo external terminal may be adapted to receive the external address book from the external server; the associated pseudo external terminal may be adapted to acquire the shared address book and the personal address book associated with the first and second user identification information from the database; the associated pseudo external terminal may be adapted to conduct synchronization between the external address book and the personal address book, and update the external address book and the personal address book as required for synchronization; and the associated pseudo external terminal may be adapted to conduct synchronization between the external address book and the shared address book, and update the external address book as required for synchronization.

The exchange system may further provide means for establishing a communication session between one of the exchange-connected terminals and one of the external terminals.

In the exchange system, the external terminals may be adapted to be associated with respective exchange-connected terminals; the exchange server may be adapted to, upon receiving from one of the exchange-connected terminals a communication session start request which designates as an opposite party of communication a pseudo exchange-connected terminal associated with a second one of the exchange-connected terminals, by using the first user identification information to be used in the pseudo exchange-connected terminal, transfer the communication session start request to the pseudo exchange-connected terminal; the pseudo exchange-connected terminal may be adapted to, upon receiving the transferred communication session start request, transfer the communication session start request to the pseudo external terminal & pseudo exchange-connected terminal; the pseudo external terminal & pseudo exchange-connected terminal may be adapted to, upon receiving the transferred communication session start request, retrieve the second user identification information associated with the first user identification information contained in the communication session start request from the database, and transmit a communication session start request containing the retrieved second user identification information to a pseudo external terminal associated with the first exchange-connected terminal; and the pseudo external terminal may be adapted to, upon receiving the communication session start request containing the second user identification information, transfer the communication session start request to the external server.

In the exchange system, the external terminals may be adapted to be associated with respective exchange-connected terminals; the pseudo external terminal may be adapted to, upon receiving from a first external terminal via the external server a communication session start request which designates, as an opposite party of communication, a pseudo external terminal associated with a second external terminal by using the second user identification information used in the pseudo external terminal, transfer the communication session start request to the pseudo external terminal & pseudo exchange-connected terminal; the pseudo external terminal & pseudo exchange-connected terminal may be adapted to, upon receiving the transferred communication session start request, retrieve the first user identification information associated with the second user identification information contained in the communication session start request from the database, and transmit the communication session start request containing the retrieved first user identification information to a pseudo exchange-connected terminal associated with the first external terminal; the pseudo exchange-connected terminal associated with the first external terminal may be adapted to, upon receiving the communication session start request, transfer the communication session start request to the exchange server; and the exchange server may be adapted to, upon receiving the transferred communication session start request, transfer the communication session start request to an exchange-connected terminal associated with the second external terminal.

In the exchange system, the pseudo exchange-connected terminals, the pseudo external terminals, the database, and the pseudo external terminal & pseudo exchange-connected terminal may be included in a LAN (an exchange).

In the exchange system, the pseudo exchange-connected terminals, the database, and the pseudo external terminal & pseudo exchange-connected terminal may be included in an exchange, and the pseudo external terminals may be included in the exchange-connected terminals.

Even if the user logs in only one of the external IM server and the exchange, terminals of both external IM server and terminals of the exchange are notified of the presence information of the user according to the present invention. Terminals of the two kinds are used simultaneously and the presence information is conveyed to the necessary opposite party without conducting presence alteration operation on both terminals.

BRIEF DESCRIPTION OF THE DRAWINGS

FIG. 5 is a diagram showing a configuration of a table and a data example included in the database shown in FIG. 4;

FIG. 6 is a sequence diagram showing a first method of a presence alteration notice according to an embodiment of the present invention;

FIG. 7 is a sequence diagram showing a second method of a presence alteration notice according to an embodiment of the present invention;

FIG. 8 is a sequence diagram showing a first method of address book synchronization according to an embodiment of the present invention;

FIG. 9 is a sequence diagram showing a second method of address book synchronization according to an embodiment of the present invention;

FIG. 11 is a sequence diagram showing a second method of communication session establishment according to an embodiment of the present invention.

DESCRIPTION OF THE PREFERRED EMBODIMENTS

Hereafter, embodiments of the present invention will be described in detail with reference to the drawings.

The IM server is opened to a large-scaled public with ordinary consumers regarded as users. On the other hand, communication systems intended for enterprises, such as KTSs (key telephone systems) and PBXs, on which an apparatus having a function similar to that of the IM server is mounted, have increased recently. The IM server has a merit that communication with worldwide subscribers can be conducted. The communication system intended for enterprises has a groupware function, a multi-line function and reliability with due regard to business use. Since a server is disposed within one's own company in principle, the communication system intended for enterprises has a merit that secret information can be protected.

Traditionally, separate terminals must be prepared to enjoy merits of both the IM server and the communication system intended for enterprises. In that case, the presence/address book is not synchronized between terminals of them and communication cannot be conducted between the terminals of them, resulting in inconvenience. The present invention implements a communication system intended for enterprises which operates in cooperation with the IM server intended for ordinary consumers.

Figure 1:
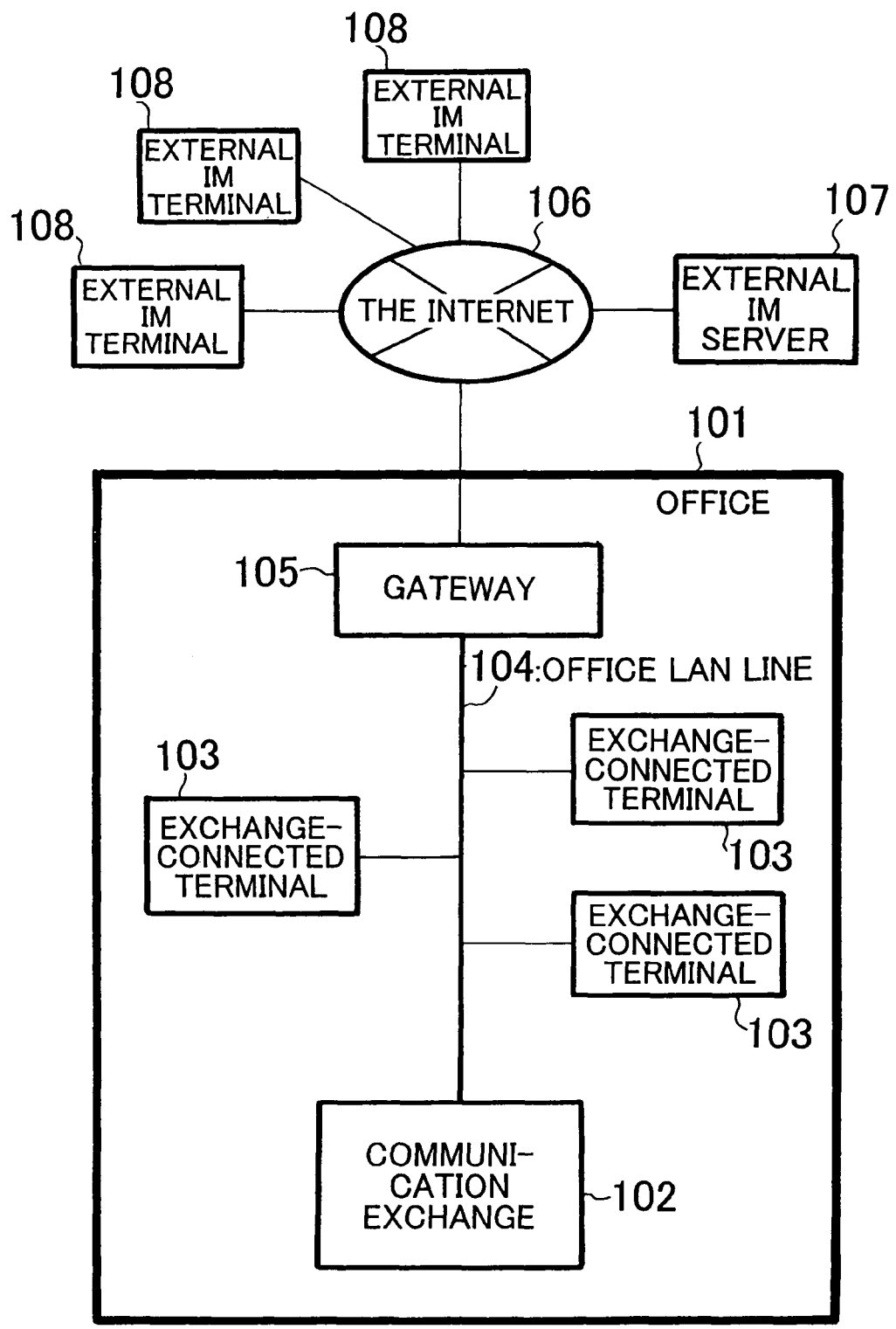
FIG. 1 is a block diagram showing a communication exchange according to an embodiment of the present invention and an apparatus group connected to the communication exchange.

With reference to FIG. 1, a communication exchange (hereafter referred to as "exchange") 102 which conducts exchange of communication such as telephone, E-mails, or instant messages (hereafter referred to as "IM") and exchange-connected terminals 103 connected to the exchange 102 are included in an office 101.

An office LAN 104 is connected to the Internet 106 via a gateway 105. Beyond the Internet 106, there are an IM server 107 for consumers (hereafter referred to as "external IM server") and external instant message terminals (hereafter referred to as "IM terminals") 108 of the external IM server 107. If the user requests presence information alteration or communication session by operating an exchange-connected terminal 103, it is conveyed to the exchange 102. The exchange 102 conveys its information to the external IM server 107, and the external IM server 107 conveys its information to the external IM terminal 108. If the user requests presence information alteration or communication session by operating the external IM terminal 108, it is first conveyed to the external IM server 107, and conveyed from the external IM server 107 to the exchange 102. The exchange 102 conveys its information to an exchange-connected terminal 103. In this way, exchange of presence information and establishment of the communication session can be conducted between the terminals 103 and 108.

In this way, it becomes possible for the user to receive IM service intended for ordinary consumers and IM service intended for enterprises simultaneously by using one terminal application.

Figure 2:
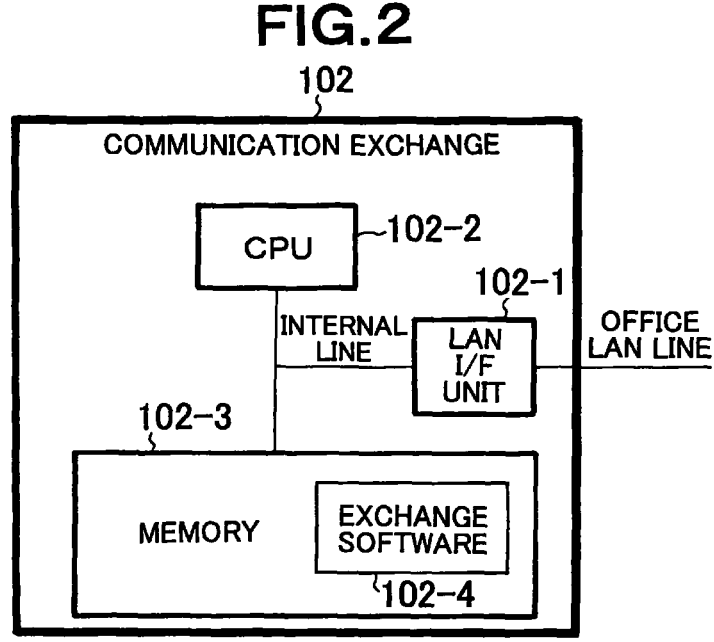
FIG. 2 is a block diagram showing a configuration of the communication exchange shown in FIG. 1.

With reference to FIG. 2, respective units in the exchange operate as described roughly below. A LAN I/F unit 102-1 conducts data transmission and reception on the office LAN 104. A CPU 102-2 executes general control on the exchange 102. A computer readable medium, memory 102-3, stores data required to control the exchange 102. Exchange software 102-4 is stored in the memory 102-3. The exchange software 102-4 is a software for general control of the exchange 102, and is executed by the CPU 102-2.

Figure 3:
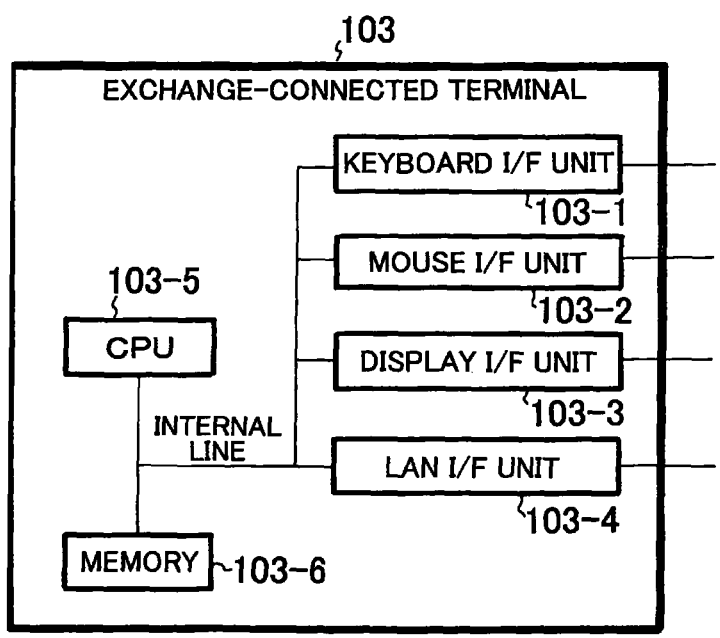
FIG. 3 is a block diagram showing a configuration of an exchange-connected terminal shown in FIG. 1.

With reference to FIG. 3, respective units in the exchange-connected terminal 103 operate as described roughly below. A keyboard I/F unit 103-1 receives an input signal from a keyboard. A mouse I/F unit 103-2 receives an input signal from a computer mouse. A display I/F unit 103-3 outputs a picture signal to a display. A LAN I/F unit 103-4 transmits a signal to or receives a signal from the office LAN 104. A CPU 103-5 controls the whole exchange-connected terminal 103. A computer readable medium, memory 103-6, stores software used to control the whole exchange-connected terminal 103 and necessary data. The software is executed by the CPU 103-5.

Figure 4:
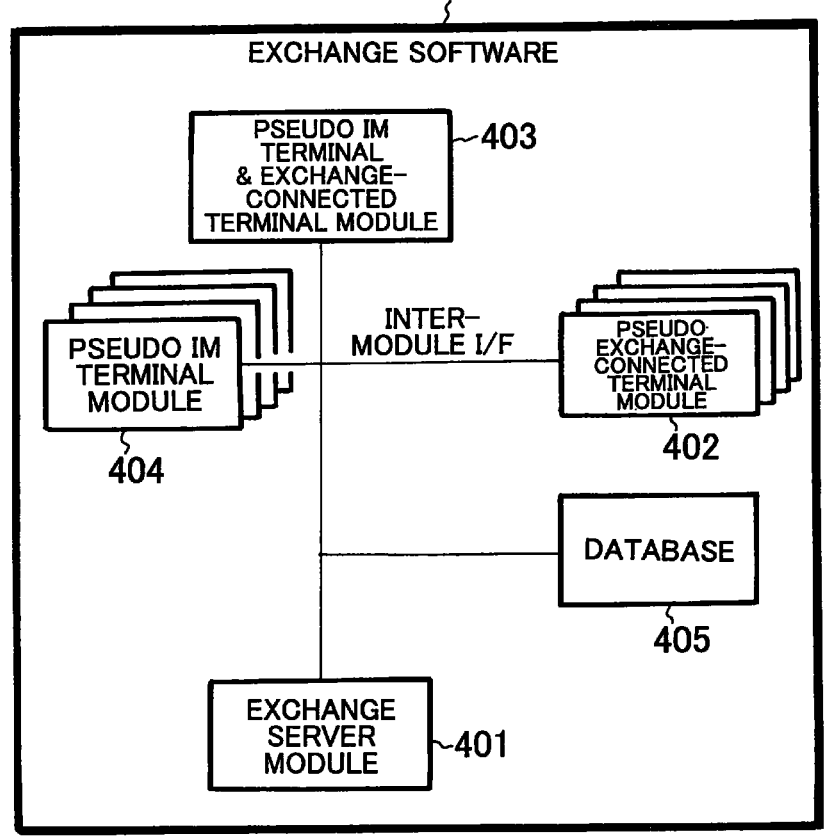
FIG. 4 is a block diagram showing modules and a database included in an exchange software shown in FIG. 2.

FIG. 4 shows a module configuration of the exchange software 102-4 stored in the memory 102-3 in the exchange. Here, the module means, for example, an instance generated on the basis of a class expressed in an object-oriented programming language.

An exchange server module 401 receives information from each terminal, and issues an order. A pseudo exchange-connected terminal module 402 is a pseudo module which conducts operation similar to that conducted by software in the exchange-connected terminal 103 connected to the exchange 102. As occasion demands, a plurality of pseudo exchange-connected terminal modules 402 are generated. A pseudo IM terminal & pseudo exchange-connected terminal module 403 is a module obtained by combining a pseudo model which conducts operation similar to that conducted by software in the exchange-connected terminal 103 with a pseudo model which conducts operation similar to that conducted by software in the external IM terminal 108. In principle, only one pseudo IM terminal & pseudo exchange-connected terminal module 403 is generated. A pseudo IM terminal module 404 is a pseudo module which conducts operation similar to that conducted by software in the external IM terminal 108. As occasion demands, a plurality of pseudo IM terminal modules 404 are generated. A database 405 stores user account information of users using the exchange-connected terminals 103, personal address books used respectively by the users, and a shared address book used by all the users.

The pseudo exchange-connected terminal modules 402 are provided so as to be respectively associated with the external IM terminals 108. The pseudo IM terminal modules 404 are provided so as to be respectively associated with the exchange-connected terminals 103. Each user owns one exchange-connected terminal 103 and one external IM terminal 108. Therefore, the exchange-connected terminals 103 are respectively associated with the external IM terminals 108. As a result, the exchange-connected terminals 103, the external IM terminals 108, the pseudo exchange-connected terminal modules 402, and the pseudo IM terminal modules 404 have a relation of 1:1:1:1.

FIG. 5 shows a table provided in the database 405 shown in FIG. 4 to store account information of users and personal and shared address books. In each record in this table, an exchange user ID 501 is an ID to be used by the exchange server module 401 to identify an exchange-connected terminal 103. An exchange user password 502 is a password associated with an exchange user ID. An IM user ID 503 is an ID to be used when a user having the exchange user ID logs in the external IM server 107. An IM user password 504 is a password associated with an IM user ID. Personal address book data 505 is address book data to be used by the user on the exchange-connected terminal 103. Shared address book data 506 is shared address book data to be used by all the users in common.

Operation of the present embodiment will now be described specifically.

First, a method for synchronizing presences between the exchange 102 and the external IM server 107 will now be described with reference to FIGS. 6 and 7.

It is supposed that the pseudo IM terminal & pseudo exchange-connected terminal module 403 has a dedicated ID for external IM client, and previously registers IM user IDs 503 of all the records in the table in the database 405 in the exchange 102 with the external IM server 107 as a Buddy list. Simultaneously with starting the exchange 102, the pseudo IM terminal & pseudo exchange-connected terminal module 403 conducts logging in the external IM server 107 and logging in the exchange server module 401. Therefore, if the user has conducted login or presence alteration via an external IM terminal 108, then the pseudo IM terminal & pseudo exchange-connected terminal module 403 can receive the information on it from the external IM server 107, and if the user has conducted login or presence alteration via an exchange-connected terminal 103, then the pseudo IM terminal & pseudo exchange-connected terminal module 403 can receive the information on it from the exchange server module 401.

With reference to FIG. 6, if a user conducts presence alteration operation on an exchange-connected terminal 103 (step S201), a notice of the alteration operation is sent to the CPU 103-5 by the keyboard I/F unit 103-1 or the mouse I/F unit 103-2 according to the operation device. The CPU 103-5 sends a notice of the presence alteration to the exchange 102 via the LAN I/F unit 103-4 (step S203). An exchange user ID is contained in this notice.

A notice of presence alteration is sent to the exchange server module 401 in the exchange software 102-4 via the LAN I/F unit 102-1 in the exchange 102. The exchange server module 401 sends a notice of the information to all the logged in exchange-connected terminals 103, all the logged in pseudo exchange-connected terminal modules 402 and the pseudo IM terminal & pseudo exchange-connected terminal module 403 (step S205). Therefore, the notice of presence alteration is sent to the pseudo IM terminal & pseudo exchange-connected terminal module 403 as well.

Upon receiving the presence alteration notice, the pseudo IM terminal & pseudo exchange-connected terminal module 403 locates an, exchange user ID contained in the notice, from the table in the database 405, and acquires an IM user ID 503 and an IM user password 504 of a hit entry (steps S207 and S209). And the pseudo IM terminal & pseudo exchange-connected terminal module 403 adds the IM user ID 503 and the IM user password 504 to the presence alteration notice, and transmits the presence alteration notice having the IM user ID and the IM user password associated with the exchange-connected terminal 103 on which the presence alteration operation has been conducted, to a pseudo IM terminal module 404 associated with the exchange-connected terminal 103 on which the presence alteration operation has been conducted (step S211).

Unless logged in, the pseudo IM terminal module 404 logs in the external IM server 107 by using the received IM user ID and password (step S213). Thereafter, the pseudo IM terminal module 404 notifies the external IM server 107 that its own presence has been altered to via the LAN I/F unit 102-1, the office LAN 104, the gateway 105, and the Internet 106 (step S215). Upon receiving the notice, the external IM server 107 sends out a presence alteration notice to the external IM terminals 108 which register the user conducted the presence alteration operation with the Buddy list of them (step S217).

With reference to FIG. 7, if a user conducts presence alteration operation on an external IM terminal 108 (step S221), a presence alteration notice is transmitted to the external IM server 107 (step S223). An external IM user ID is contained in this notice.

The external IM server 107 transfers the presence alteration notice to all the logged in external IM terminals 108, all the logged in pseudo IM terminal modules 404, and the pseudo IM terminal & pseudo exchange-connected terminal module 403 (step S225). Therefore, the presence alteration notice is sent to the pseudo IM terminal & pseudo exchange-connected terminal module 403 in the exchange software 102-4 via the Internet 106, the gateway 105, the office LAN 104, and the LAN I/F unit 102-1.

Upon receiving the notice, the pseudo IM terminal & pseudo exchange-connected terminal module 403 conducts retrieval in the table included in the database 405 by using the external IM user ID contained in the notice, and acquires the exchange user ID 501 and the exchange user password 502 of the hit entry (steps S227 and S229). And the pseudo IM terminal & pseudo exchange-connected terminal module 403 transmits the presence alteration notice with the retrieved exchange user ID 501 and the exchange user password 502 to the pseudo exchange-connected terminal module 402 which is associated with the external IM terminal 108 on which the user conducts presence alteration operation (step S231).

Unless logged in, the pseudo exchange-connected terminal module 402 logs in the exchange server module 401 (step S233). Thereafter, the pseudo exchange-connected terminal module 402 notifies to the exchange server module 401 that its own presence has been altered (step S235).

Upon receiving the notice, the exchange server module 401 notifies the presence alteration to the exchange-connected terminals (S237).

A method for synchronizing a personal address book and an external address book will now be described with reference to FIG. 8.

With reference to FIG. 8, if a user conducts login operation on an exchange-connected terminal 103 (step S241), a notice of the login operation is sent to the CPU 103-5 by the keyboard I/F unit 103-1 or the mouse I/F unit 103-2 according to the operation device. The CPU 103-5 sends a login notice to the exchange 102 via the LAN I/F unit 103-4 (step S243). An exchange user ID input to the logged in exchange-connected terminal 103 is contained in the login notice. A login notice is sent to the exchange server module 401 in the exchange software 102-4 via the LAN I/F unit 102-1 in the exchange 102.

The exchange server module 401 transmits a login notice to all the logged in exchange-connected terminals 103, all the logged in pseudo exchange-connected terminal modules 402 and the pseudo IM terminal & pseudo exchange-connected terminal module 403 (step S245). Therefore, the login notice is sent to the pseudo IM terminal & pseudo exchange-connected terminal module 403 as well.

Upon receiving the notice, the pseudo IM terminal & pseudo exchange-connected terminal module 403 locates an exchange user ID contained in the login notice, from the table in the database 405, and acquires an IM user ID 503 and an IM user password 504 of a hit entry (steps S247 and S249). And the pseudo IM terminal & pseudo exchange-connected terminal module 403 transmits a login notice with the IM user ID 503 and the IM user password 504 to a pseudo IM terminal module 404 associated with the IM user ID (step S251).

The pseudo IM terminal module 404 logs in the external IM server 107 via the LAN I/F unit 102-1, the office LAN 104, the gateway 105 and the Internet 106 by using the received IM user ID and password (step S253).

Thereupon, the external IM server 107 sends the login notice to the external IM terminals 108 which register the user conducted the login operation with the Buddy list of them (step S255). In addition, the external IM server 107 transmits an external address book (Buddy list) of the user conducted the login operation in the external IM server 107 to the logged in pseudo IM terminal module 404 (step S257).

Upon receiving the external address book data, the pseudo IM terminal module 404 locates the IM user ID 503 in the database 405 in the exchange which is the same as the IM user ID of the logged in user, and acquires the personal address book data 505 of the hit entry (steps S259 and S261).

Thereafter, the pseudo IM terminal module 404 synchronizes both the acquired address book data, i.e., the external address book data and the personal address book data 505 (step S263). As the synchronization algorithm, a typical algorithm can be applied.

For example, it is possible to apply an algorithm which gives priority to one of the address books, an algorithm which does not give priority to any address book and which gives priority to a record having later update date when contraction has occurred, or an algorithm which does not give priority to any address book and which urges the user to select data to be given priority when contraction has occurred.

After the synchronization has been completed, the pseudo IM terminal module 404 stores the address book data in the pertinent entry of the personal address book data 505 of the database 405 and stores the address book data in the external IM server 107 (steps S265, S267, S269 and S271).

According to the embodiment, it becomes possible to use a unified address book no matter to which of the external IM server 107 and the exchange 102 the user is logged in, and the trouble of administering separate address books respectively in terminals of the two kinds is eliminated.

A method for synchronizing a personal address book and an external address book and then synchronizing the shared address book and the external address book will now be described with reference to FIG. 9. Here, "synchronizing a personal address book and an external address book" means making contents of them the same. However, "synchronizing the shared address book and an external address book" means that changes in the shared address book are reflected to the external address book, but contents of the shared address book are not altered.

Steps S241 to S267 are the same as those in the case where only synchronization of the personal address book and the external address book is conducted.

Subsequently to the step S267, the pseudo IM terminal module 404 acquires the shared address book 506 from the database 405 (steps S281 and S283).

Subsequently, the pseudo IM terminal module 404 synchronizes the external address book and shared address book (step S285), and transmits an external address book update request to the external IM server 107 (step S287). The external IM server 107 updates the external address book in response to the request (step S289).

As a result, it becomes possible to use the shared address book which has been traditionally used only in exchanges intended for enterprises, even when a user logs in the external IM server for which users are many and unspecified ordinary consumer users and there is not a concept of shared address book. It becomes possible to administer address books unitarily.

A method for establishing a communication session (such as talking, an IM, or application sharing) between the external IM terminal 108 and the exchange-connected terminal 103 will now be described with reference to FIGS. 10 and 11.

Figure 10:
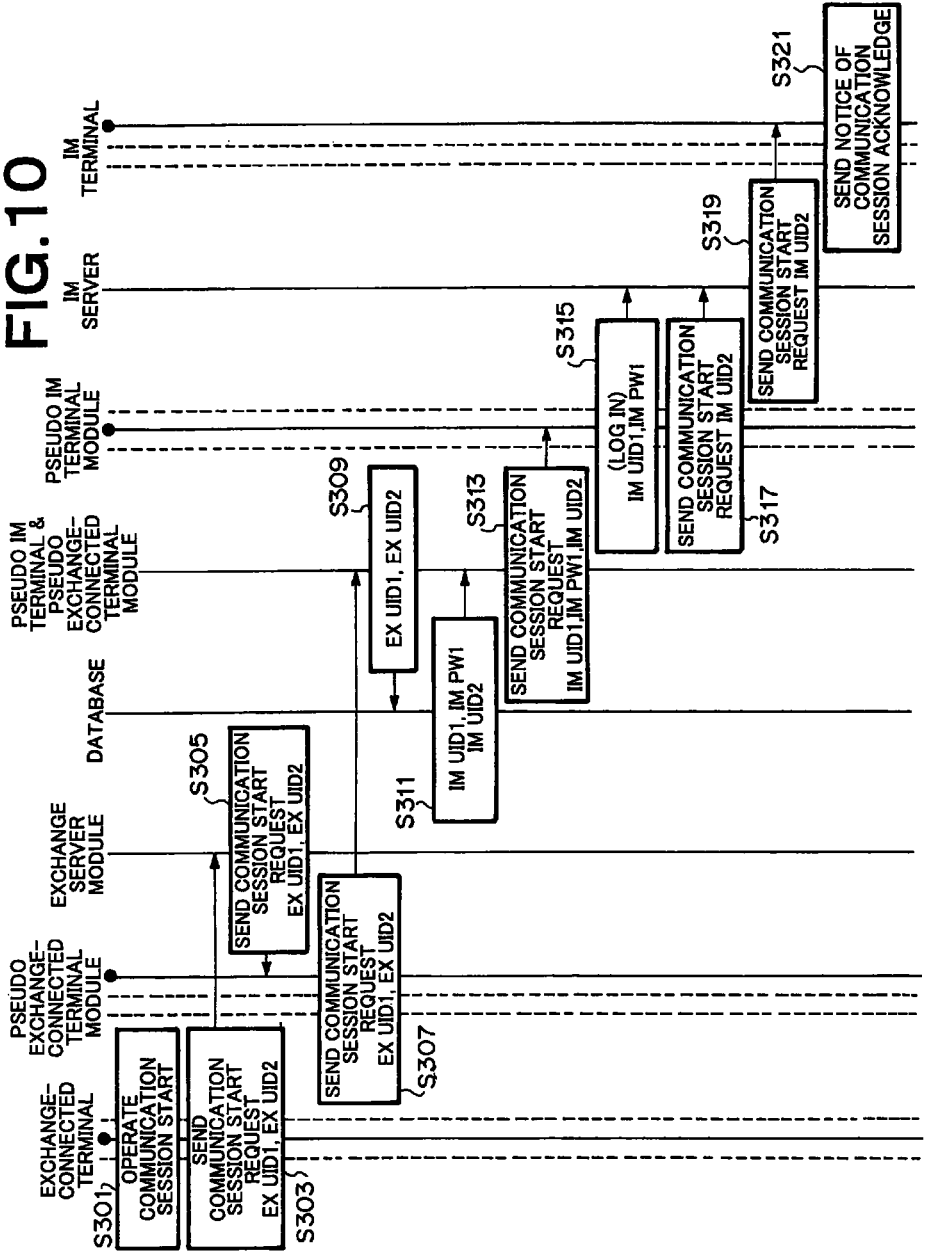
FIG. 10 is a sequence diagram showing a first method of communication session establishment according to an embodiment of the present invention.

With reference to FIG. 10, if a user conducts communication session start operation on an exchange-connected terminal 103 (step S301), a notice of the communication session start request is sent to the CPU 103-5 by the keyboard I/F unit 103-1 or the mouse I/F unit 103-2 according to the operation device. The CPU 103-5 sends a notice of the communication session start request to the exchange 102 via the LAN I/F unit 103-4 (step S303). An exchange user ID of the exchange-connected terminal that has issued the communication session start request and an exchange user ID of an exchange-connected terminal associated with an external IM terminal 108 that will receive the communication session start request are contained in the communication session. A notice of the communication session start request is sent to the exchange server module 401 in the exchange software 102-4 via the LAN I/F unit 102-1 in the exchange 102.

The exchange server module 401 sends a notice of the information to a pseudo exchange-connected terminal module 402 logged in with an account of the opposite party of communication (step S305).

The pseudo exchange-connected terminal module 402 sends a notice of the request to the pseudo IM terminal & pseudo exchange-connected terminal module 403 (step S307).

Upon receiving the notice, the pseudo IM terminal & pseudo exchange-connected terminal module 403 locates an exchange user ID of the communication request origin contained in the notice from the table in the database 405, and acquires an IM user ID 503 and an IM user password 504 (IM user ID of the communication request origin and IM password of the communication request origin) of a hit entry. In addition, the pseudo IM terminal & pseudo exchange-connected terminal module 403 locates an exchange user ID of the communication request destination contained in the notice from the table in the database 405, and acquires an IM user ID 503 (IM user ID of the communication request destination) of a hit entry (steps S309 and S311). And the pseudo IM terminal & pseudo exchange-connected terminal module 403 transmits a communication session start request with the IM user ID of the communication request origin and the password of the communication request origin and the IM user ID of the communication request destination added thereto, to a pseudo IM terminal module 404 associated with the exchange-connected terminal 103 of the communication request origin (step S313).

Unless logged in, the pseudo IM terminal module 404 logs in the external IM server 107 by using the received IM user ID and password of the communication request origin (step S315). While using the address of the exchange-connected terminal 103 of the communication request origin as the address of the communication request origin, the pseudo IM terminal module 404 sends a notice of a communication session start request directed to the external IM terminal of the communication opposite party, to the external IM server 107 via the LAN I/F unit 102-1, the office LAN 104, the gateway 105 and the Internet 106 (step S317).

Upon receiving the notice of the communication session start request, the external IM server 107 sends a communication session start request to the external IM terminal 108 of the communication opposite party (step S319).

Upon receiving the communication session start request, the external IM terminal 108 of the communication opposite party establishes the communication session by sending a notice of communication session acknowledge to the exchange-connected terminal 103 of the communication start request origin contained in the request (step S321).

With reference to FIG. 11, if a user conducts communication session start operation on an external IM terminal 108 (step S331), the external IM terminal 108 sends a notice of a communication session start request to the external IM server 107 (step S333). An IM user ID of the external IM terminal 108 of the request origin and an IM user ID associated with the exchange-connected terminal 103 of the request destination are contained in the communication session start request.

The external IM server 107 transfers the communication session start request to a pseudo IM terminal module 404 having the IM user ID associated with the exchange-connected terminal 103 of the request destination (step S335). The notice of the communication session start request is sent to a pseudo IM terminal module 404 of communication opposite party in the exchange software 102-4 via the LAN I/F unit 102-1 in the exchange 102.

Upon receiving the notice of the communication session start request, the pseudo IM terminal module 404 sends the notice of the request to the pseudo IM terminal & pseudo exchange-connected terminal module 403 (step S337).

The pseudo IM terminal & pseudo exchange-connected terminal module 403 retrieves an exchange user ID associated with the IM user ID of the external IM terminal 108 of the communication request origin and an exchange user ID associated with the IM user ID which is in turn associated with the exchange-connected terminal 103 of the request destination, from the table in the database 405 (steps S339 and S341).

Subsequently, the pseudo IM terminal & pseudo exchange-connected terminal module 403 transmits the request to a pseudo exchange-connected terminal module 402 logged in with an account of the exchange user of the communication start request origin (step S343).

The pseudo exchange-connected terminal module 402 uses the address of the external IM terminal of the communication request origin as the address of the communication request origin, and sends a notice of a communication session start request directed to the exchange-connected terminal 103 of the communication opposite party, to the exchange server module 401 (step S345).

Upon receiving the notice of the communication session start request, the exchange server module 401 sends a communication session start request to the exchange-connected terminal 103 of the communication opposite party (step S347).

Upon receiving the communication session start request, the exchange-connected terminal 103 of the communication opposite party establishes a communication session with the external IM terminal 108 of the communication start request origin contained in the request, and transmits communication session acknowledge to the external IM terminal of the communication request origin via the exchange server module 401, the pseudo exchange-connected terminal module 402, the pseudo IM terminal & pseudo exchange-connected terminal module 403, the pseudo IM terminal module 404 and the external IM server 107 (step S349).

No matter to which of the exchange 102 and the external IM server 107 a user belongs, therefore, the user can establish a communication session with both terminals.

Another embodiment of the present invention will now be described.

In the above-described embodiment, the pseudo IM terminals are included in the exchange software 102-4 in the exchange server 102. Alternatively, the pseudo IM terminals may be included respectively in the exchange-connected terminals 103, and login/logout of a pseudo IM terminal to the external IM server 107 may be altered manually in the exchange-connected terminals 103.

In this case, unlike the above-described embodiment, the pseudo IM terminal module 404 is moved into the memory 103-6 in the exchange-connected terminal 103, and it is obviated that unless logged in the pseudo IM terminal module 404 automatically logs in at the step S213 shown in FIG. 6, the step S253 shown in FIG. 8, and the step S315 shown in FIG. 10. Unless a pseudo IM terminal module 404 is manually logged in even if an exchange-connected terminal user logs in an exchange-connected terminal, it is inhibited to conduct presence synchronization, the address book synchronization, and the communication session establishment with the external IM server 107 and the external IM terminal 108.

When it is desired for the pseudo IM terminal module 404 to log in or log out the external IM server 107, a notice of a login or logout request is sent to the CPU 103-5 together with the ID and password for the external IM server 107 by the keyboard I/F unit 103-1 or the mouse I/F unit 103-2 in response to operation of an operation device on the exchange-connected terminal 103. The CPU 103-5 sends a notice of the pseudo IM terminal login or logout request, the ID and password to the pseudo IM terminal module 404 in the memory 103-6. The pseudo IM terminal module 404 sends a login or logout notice to the external IM server 107 by using the ID and password via the LAN I/F unit 103-4, the office LAN 104, the gateway 105, and the Internet 106.

As a result, it becomes possible for the exchange-connected terminal 103 to turn on or off cooperation with the external IM server 107 as occasion demands, in such a case where it is desired to shut out communication with an acquaintance via the external IM server 107 because of important work being held.

The present invention can be used to share presence information, make address books uniform, and conduct communication between a terminal connected to a system and a terminal connected to another system.

What is claimed is:

1. An exchanger connected to external terminals and an external server through a network and connected to exchange-connected terminals, the exchanger comprising:
    an exchange server portion;
    pseudo exchange-connected terminal portions;
    pseudo external terminal portions;
    a database, and
    a pseudo external terminal and pseudo exchange-connected terminal portion,
    wherein the exchange server portion is adopted to connect the exchange-connected terminals to each other;
    the pseudo exchange-connected terminal portions correspond to respective external terminals and function as exchange-connected terminals with respect to the exchange server portion;
    the pseudo external terminal portions correspond to respective exchange-connected terminals and function as external terminals with respect to the external server;
    the database retains corresponding relations between a first user identification used in the exchange-connected terminals and a second user identification used in the external terminals;
    the pseudo external terminal and pseudo exchange-connected terminal portion retrieves the second user identification associated with the first user identification from the database, retrieves the first user identification associated with the second user identification from the database, functions as an exchange-connected terminal with respect to the exchange server portion by using the first user identification, and instructs one of the pseudo external terminal portions to function as a corresponding external terminal with respect to the external server based on the second user identification;
    access from a user to the exchanger is carried out through at least one of the exchange-connected terminals; and
    the pseudo exchange-connected terminal portions, the pseudo external terminal portions and the pseudo external terminal and pseudo exchange-connected terminal portion are independent with respect to one another.

2. The exchanger according to claim 1, further comprising a means for transmitting a presence alteration notice from one of the exchange-connected terminals to the external terminals.

3. The exchanger according to claim 2, wherein
    the exchange server portion, upon receiving a presence alteration notice containing the first user identification from an exchange-connected terminal, transfers the presence alteration notice to at least the pseudo external terminal and pseudo exchange-connected terminal portion,
    the pseudo external terminal and pseudo exchange-connected terminal portion, upon receiving the transferred presence alteration notice, retrieves the second user identification corresponding to the first user identification contained in the presence alteration notice from the database, and transmits a presence alteration notice containing the retrieved second user identification to a pseudo external terminal portion, and the pseudo external terminal portion, upon receiving the presence alteration notice containing the retrieved second user identification, transfers the presence alteration notice to the external server.

4. The exchanger according to claim 1, further comprising a means for transmitting a presence alteration notice to the external terminals and the exchange-connected terminals.

5. The exchanger according to claim 4, wherein
the pseudo external terminal and pseudo exchange-connected terminal portion, upon receiving a presence alteration notice containing the second user identification from the external server, retrieves the first user identification corresponding to the second user identification contained in the presence alteration notice from the database, and transmits the presence alteration notice containing the retrieved first user identification to a pseudo exchange-connected terminal portion having the first user identification,
the pseudo exchange-connected terminal portion, upon receiving the transmitted presence alteration notice, transfers the presence alteration notice to the exchange server portion, and
the exchange server portion, upon receiving the presence alteration notice containing the first user identification, transfers the presence alteration notice to the exchange-connected terminals.

6. The exchanger according to claim 1, further comprising a means for synchronizing a personal address book used by one of the exchange-connected terminals with an external address book used by the external terminals.

7. The exchanger according to claim 6, wherein
the database retains associations and relationships between a first user identification used on the exchange-connected terminals and a second user identification and passwords used on the external terminals, and personal address books associated with the first and second user identification,
the exchange server portion, upon receiving a login notice containing the first user identification from one of the exchange-connected terminals, transfers the login notice to at least the pseudo external terminal and pseudo exchange-connected terminal portion,
the pseudo external terminal and pseudo exchange-connected terminal portion, upon receiving the transferred login notice, retrieves the second user identification and password associated with the first user identification contained in the login notice from the database, and transmits a login notice containing the retrieved second user, identification and password to an associated pseudo external terminal portion,
the associated pseudo external terminal portion, upon receiving the login notice containing the second user identification and password, logs into the external server,
receives the external address book from the external server,
acquires the personal address book associated with the first and second user identification from the database, and
synchronizes and updates the external address book and the personal address book.

8. The exchanger according to claim 1, further comprising a means for synchronizing a personal address book of one of the exchanged-connected terminals and a shared address book used by all of the exchange-connected terminals with an external address book used by the external terminals.

9. The exchanger according to claim 8, wherein
the database retains associations and relationships between the first user identification, the second user identification, passwords used on the external terminals, the shared address book, and personal address books associated with user identification,
the exchange server portion, upon receiving a login notice containing the first user identification from one of the exchange-connected terminals, transfers the login notice to at least the pseudo external terminal and pseudo exchange-connected terminal portion,
the pseudo external terminal and pseudo exchange-connected terminal portion, upon receiving the transferred login notice, retrieves the second user identification and password associated with the first user identification contained in the login notice from the database, and transmits a login notice containing the retrieved second user identification and password to an associated pseudo external terminal portion,
the associated pseudo external terminal portion, upon receiving the login notice containing the second user identification and password, logs into the external server,
receives the external address book from the external server,
acquires the shared address book and the personal address book associated with the first and second user identification from the database,
synchronizes and updates the external address book and the personal address book, and
synchronizes the external address book and the shared address book, and updates the external address book.

10. The exchanger according to claim 1, further comprising a means for establishing communication between one of the exchange-connected terminals and one of the external terminals.

11. The exchanger according to claim 8, wherein
the external terminals are associated with respective exchange-connected terminals,
the exchange server portion, upon receiving from a first one of the exchange-connected terminals a request for communication with, a pseudo exchange-connected terminal portion associated with a second one of the exchange-connected terminals by the first user identification, transfers the request for communication to the pseudo exchange-connected terminal portion,
the pseudo exchange-connected terminal portion, upon receiving the transferred request for communication, transfers the request for communication to the pseudo external terminal and pseudo exchange-connected terminal portion,
the pseudo external terminal and pseudo exchange-connected terminal portion, upon receiving the transferred request for communication, retrieves the second user identification corresponding to the first user identification from the database, and transmits a request for communication containing the retrieved second user identification to a pseudo external terminal portion associated with the first exchange-connected terminal, and
the pseudo external terminal portion, upon receiving the request for communication containing the second user identification, transfers the request containing the second user identification to the external server.

12. The exchanger according to claim 10, wherein
the external terminals correspond with respective exchange-connected terminals,
a first pseudo external terminal portion, upon receiving from a first external terminal, via the external server, a request for communication with a second pseudo external terminal portion corresponding with a second external terminal, based on the second user identification contained in the request, transfers the communication request to the pseudo external terminal and pseudo exchange-connected terminal portion, the pseudo external terminal and pseudo exchange-connected terminal portion, upon receiving the transferred communication request, retrieves the first user identification corresponding to the second user identification from the database, and transmits a communication request containing the retrieved first user identification to a pseudo exchange-connected terminal portion associated with the first external terminal, the pseudo exchange-connected terminal portion associated with the first external terminal, upon receiving the communication request containing the first user identification, transfers the communication request to the exchange server portion, and the exchange server portion, upon receiving the transferred communication request, transfers the communication request to an exchange-connected terminal associated with the second external terminal.

13. A method for transmitting a presence alteration notice from one of a plurality of exchange-connected terminals to a plurality of external terminals, the exchange-connected terminals being connected to an exchanger, the exchanger being connected to the plurality of external terminals and an external server through a network, the exchanger comprising an exchange server portion, pseudo exchange-connected terminal portions, pseudo external terminal portions, a database, and a pseudo external terminal and pseudo exchange-connected terminal portion, access from a user to the exchanger being carried out through the one of the plurality of exchange-connected terminals, the pseudo exchange-connected terminal portions, the pseudo external terminal portions and the pseudo external terminal and pseudo exchange-connected terminal portion being independent with respect to one another, said method comprising the steps of:

the exchange server portion, upon receiving a presence alteration notice containing a first user identification from the exchange-connected terminal, transfers the presence alteration notice to at least the pseudo external terminal and pseudo exchange-connected terminal portion, the pseudo external terminal & pseudo exchange-connected terminal portion, upon receiving the transferred presence alteration notice, retrieves a second user identification corresponding to the first user identification from the database, and transmits a presence alteration notice containing the retrieved second user identification to the pseudo external terminal portion, and the pseudo external terminal portion, upon receiving the presence alteration notice containing the second user identification, transfers the notice containing the second user identification to the external server.

14. The method of claim 13, further comprising:

the pseudo external terminal and pseudo exchange-connected terminal portion, upon receiving a presence alteration notice containing the second user identification from the external server, retrieves the first user identification corresponding to the second user identification from the database, and transmits a presence alteration notice containing the retrieved first user identification to a pseudo exchange-connected terminal portion having the first user identification, the pseudo exchange-connected terminal portion to, upon receiving the transmitted presence alteration notice containing the first use identification, transfers the presence alteration notice containing the first user identification to the exchange server portion, and the exchange server portion, upon receiving the presence alteration notice containing the first user identification, transfers the presence alteration notice containing the first user identification to the plurality of exchange-connected terminals.

15. The method of claim 13, further comprising:

the exchange server portion, upon receiving a login notice containing the first user identification from one of the exchange-connected terminals, transfers the login notice to at least the pseudo external terminal and pseudo exchange-connected terminal portion, the pseudo external terminal and pseudo exchange-connected terminal portion, upon receiving the transferred login notice, retrieves the second user identification, and a password associated with the first user identification from the database, and transmits a login notice containing the retrieved second user identification and password to an associated pseudo external terminal portion, the associated pseudo external terminal portion, upon receiving the login notice containing the second user identification and password, logs into the external server, receives en external address book from the external server, acquires a personal address book associated with the first and second user identification from the database, and synchronizes and updates the external address book and the personal address book.

16. The method of claim 15, further comprising:

the associated pseudo external terminal portion acquires a shared address book associated with the first and second user identification from the database, and synchronizes the external address book and the shared address book, and updates the external address book.

17. A method for establishing a communication session between an exchange-connected terminal and an external terminal, wherein a plurality of external terminals are associated with respective exchange-connected terminals, the exchange-connected terminals being connected to an exchanger, the exchanger being connected to the plurality of external terminals and an external server through a network, the exchanger comprising an exchange server portion, pseudo exchange-connected terminal portions, pseudo external terminal portions, a database, and a pseudo external terminal and pseudo exchange-connected terminal, access from a user to the exchanger being carried out through the exchange-connected terminal, the pseudo exchange-connected terminal portions, the pseudo external terminal portions and the pseudo external terminal and pseudo exchange-connected terminal portion being independent with respect to one another, said method comprising the steps of:

the exchange server portion, upon receiving from a first exchange-connected terminal a request for communication with the pseudo exchange-connected terminal portion associated with a second exchange-connected terminal based on a first user identification to be used in the pseudo exchange-connected terminal portion, transfers the communication request to the pseudo exchange-connected terminal portion, the pseudo exchange-connected terminal portion, upon receiving the transferred communication request, transfers the communication request to the pseudo external terminal and pseudo exchange-connected terminal portion, the pseudo external terminal & pseudo exchange-connected terminal portion, upon receiving the transferred communication request, retrieves a second user identification associated with the first user identification from the database, and transmits a communication request containing the retrieved second user identification the pseudo external terminal portion associated with the first exchange-connected terminal, and the pseudo external terminal portion, upon receiving the communication request containing the second user identification, transfers the communication request to the external server.

18. The method of claim 17, further comprising:

the pseudo external, terminal portion, upon receiving from a first external tet urinal via the external server a request for communication with a pseudo external terminal portion associated with a second external terminal based on a second user identification used in the pseudo external terminal portion, transfers the communication request to the pseudo external terminal & pseudo exchange-connected terminal portion, the pseudo external terminal and pseudo exchange-connected terminal portion, upon receiving the transferred communication request, retrieves a first user identification associated with the second user identification from the database, and transmits a communication request containing the retrieved first user identification to a pseudo exchange-connected terminal portion associated with the second external terminal, the pseudo exchange-connected terminal portion associated with the second external terminal, upon receiving the communication request containing the first user, identification, transfers the communication request to the exchange server portion, and the exchange server portion, upon receiving the transferred communication request containing the first user identification, transfers the communication request to an exchange-connected terminal associated with the second external terminal.

19. A non-transitory computer-readable medium having program instructions that cause a computer to function as an exchanger comprising pseudo exchange-connected terminal portions, pseudo external terminal portions, a database, and a pseudo external terminal and pseudo exchange-connected terminal portion, the computer being connected to exchange-connected terminals and being connected to a plurality of external terminals through a network, access from a user to the computer being carried out through at least one of the exchange-connected terminals, the pseudo exchange-connected terminal portions, the pseudo external terminal portions and the pseudo external terminal and pseudo exchange-connected terminal portion being independent with respect to one another, the program instructions cause the pseudo external terminal and pseudo exchange-connected terminal portion to, upon receiving a transferred presence alteration notice containing a first user identification, retrieve a second user identification associated with a first user identification from the database, and transmit a presence alteration notice containing the retrieved second user identification to the pseudo external terminal portion.

20. The non-transitory computer readable medium according to claim 19, wherein the program instructions further cause the pseudo external terminal portion to, upon receiving the presence alteration notice containing the second user identification, transfer the presence alteration notice to an external server.

21. The non-transitory computer-readable medium according to claim 19, wherein the program instructions further cause the pseudo external terminal and pseudo exchange-connected terminal portion to, upon receiving a presence alteration notice containing the second user identification from the external server, retrieve the first user identification from the database, and transmit a presence alteration notice containing the retrieved first user identification to a pseudo exchange-connected terminal portion having the first user identification, the pseudo exchange-connected terminal portion to, upon receiving the transmitted presence alteration notice containing the first user identification, transfer the presence alteration notice to an exchange server portion, and the exchange server portion to, upon receiving the presence alteration notice containing the first user identification, transfer the presence alteration notice to exchange-connected terminals.

22. The non-transitory computer-readable medium of claim 19, wherein the program instructions further cause the pseudo external terminal and pseudo exchange-connected terminal portion to, upon receiving a transferred login notice containing the first user identification, retrieve the second user identification and a password associated with the first user identification from the database, and transmit a login notice containing the retrieved second user identification and password to an associated pseudo external terminal portion.

23. The non-transitory computer-readable medium according to claim 22, wherein the program instructions further cause the associated pseudo external terminal portion to, upon receiving the login notice containing the second user identification and password, log into the external server, receive an external address book from the external server, acquire a personal address book associated with the first and second user identification from the database, and synchronize the external address book and the personal address book, update the external address book and the personal address book and transmit the updated external address book to the external server.

24. The non-transitory computer-readable medium of claim 19, wherein the program instructions further cause the pseudo external terminal and pseudo exchange-connected terminal portion to, upon receiving the transferred login notice containing the first user identification, to retrieve the second user identification and a password associated with the first user identification from the database, and transmit a login notice containing the retrieved second user identification and password to an associated pseudo external terminal portion.

25. The non-transitory computer-readable medium of claim 24, wherein the program instructions further cause the associated pseudo external terminal portion to, upon receiving the login notice containing the second user identification and password, log into an external server, acquire an external address book from the external server, acquire a shared address book and a personal address book associated with the first and second user identifications from the database, synchronize and update the external address book and the personal address book, and synchronize the external address book and the shared address book, and update and transmit the updated external address book to the external server.

26. The non-transitory computer-readable medium of claim 19, wherein the program instructions further cause the pseudo exchange-connected terminal portion to, upon receiving a transferred communication request containing the first user identification, transfer the communication request to the pseudo external terminal and pseudo exchange-connected terminal portion, and the pseudo external terminal and pseudo exchange-connected terminal portion, upon receiving the transferred communication request, retrieves the second user identification associated with a first user identification from the database, and transmits a communication request containing the retrieved second user identification to an associate pseudo external terminal portion.

27. The non-transitory computer-readable medium of claim 26, wherein the program instructions further cause the pseudo external terminal portion to, upon receiving the communication request containing the second user identification, transfer the communication request to the external server.

28. The non-transitory computer-readable medium of claim 19, wherein the program instructions further cause the pseudo external terminal portion to, upon receiving, from a first external terminal, a communication request containing a second user identification, for communication with another pseudo external terminal portion associated with a second external terminal, transfer the communication request to the pseudo external terminal and pseudo exchange-connected terminal portion, the pseudo external terminal and pseudo exchange-connected terminal portion to, upon receiving the transferred communication request, retrieve a first user identification associated with a second user identification from the database, and transmit a communication request containing the retrieved first user identification to a pseudo exchange-connected terminal portion associated with the second external terminal, the pseudo exchange-connected terminal portion associated with the second external terminal to, upon receiving the communication request, transfer the communication request to an exchange server portion, and the exchange server portion to, upon receiving the transferred communication request, transfer the communication request to an exchange-connected terminal associated with the second external terminal.

* * * * *